United States Patent [19]

Allen

[11] Patent Number: 4,962,150

[45] Date of Patent: Oct. 9, 1990

[54] POLYMERIC STABILIZERS, THEIR PREPARATION AND DISPERSIONS CONTAINING THEM

[75] Inventor: Adrian S. Allen, Skipton, Great Britain

[73] Assignee: Allied Colloids Ltd., United Kingdom

[21] Appl. No.: 325,197

[22] Filed: Mar. 17, 1989

[30] Foreign Application Priority Data

Mar. 18, 1988 [GB] United Kingdom ............... 8806541

[51] Int. Cl.$^5$ .............................................. C08L 77/00
[52] U.S. Cl. .................................... 524/602; 524/728
[58] Field of Search ................................ 524/728, 602

[56] References Cited

U.S. PATENT DOCUMENTS 4,224,212  9/1960  Topham ........................... 524/190

Primary Examiner—Joseph L. Schofer
Assistant Examiner—Jeffrey T. Smith
Attorney, Agent, or Firm—Ostrolenk, Faber, Gerb & Soffen

[57] ABSTRACT

An oil soluble polymeric surfactant that is particularly useful for stabilizing reverse phase polymer dispersions, especially when they are subjected to azeotroping, is a reaction product of an oil soluble polyester carboxylic acid (such as poly-hydroxy stearic acid) and a water soluble polyamine (such as polyethylene imine) of molecular weight above 500 and that contains at least 5 basic nitrogen atoms.

13 Claims, No Drawings

POLYMERIC STABILIZERS, THEIR PREPARATION AND DISPERSIONS CONTAINING THEM

This invention relates to oil-soluble surfactants that can serve as stabilisers for dispersions of organic or inorganic particles in a substantially non-polar liquid. The invention is of particular value when applied to reverse phase polymer dispersions.

Reverse phase polymer dispersions can be made by reverse phase polymerisation of aqueous polymerisable monomer dispersed in a water-immiscible liquid. It is necessary to include dispersion stabiliser in order to stabilise the dispersion, for instance to produce a storage-stable dispersion having a particle size typically of well below 10 $\mu$m.

Reverse phase polymer dispersions having low pour point and good freeze-thaw stability can be made using either conventional low HLB monomeric surfactants such as sorbitan mono-oleate or glyceryl mono-oleate or condensates of, for instance, polyhydroxy stearic acid and polyethylene glycol, as described in GB No. 2,002,400. However these dispersions are liable to agglomerate and coagulate if an attempt is made to concentrate them by evaporation at high speed and under high temperature and high shear conditions, such as are experienced in thin film evaporators.

Reverse phase polymer dispersions can be concentrated by evaporation in this manner if they are stabilised by amphipathic addition copolymers of hydrophobic and hydrophilic ethylenically unsaturated monomers, for instance as described in GB No. 1,482,515. An example is copolymer of ceto stearyl methacrylate and methacrylic acid. Amphipathic addition polymers such as these can be used as the sole stabiliser, or they can be used in combination with a conventional low HLB surfactant or the polyhydroxy stearic acid-polyethylene glycol condensate. Although the resultant concentrates can have high polymer content (e.g., 70%) and good stability they can suffer from some disadvantages. For instance the described amphipathic addition copolymers can, in some instances, have a tendency to depress molecular weight. Another disadvantage is that dispersions containing such copolymers tend to have a high pour point. Also dispersions containing these copolymers and which also include water (for instance by dilution of the dehydrated dispersion) have poor freeze-thaw stability and so cannot satisfactorily be used under sub-zero conditions.

Reverse phase dispersions having very small particle size, down to 0.02 $\mu$m, can be made in the presence of a very large amount (generally above 30% based on polymer) low HLB emulsifier as described in U.S. Pat. No. 3,284,393. In recent years preferred processes have used a dispersion stabiliser system consisting of much less low HLB emulsifier (typically in the range 5 to 10% based on monomer) together with amphipathic addition polymeric stabiliser (typically 2 to 10% based on monomer) and/or hydroxy stearic/polyethylene glycol condensate. The particle size is dictated primarily by the amount of shear applied during the emulsification since the polymerisation primarily follows suspension kinetics. The average particle size is often above 0.5 $\mu$m, almost regardless of the amount of shear that is applied, and in practice it is frequently above 1.5 or 2 $\mu$m even if a very large amount of shear is applied. Even though the total amount of dispersion stabiliser is now much less than in the early processes, it would be desirable to reduce it still further since the presence of the emulsifier and stabiliser in the final dispersion can lead to adverse effects during the subsequent use of the dispersion. However the provision of dispersions having very small particle size is desirable and so it would be desirable to provide a dispersion stabiliser system that could be used at lower levels than existing stabiliser/surfact combinations and yet which could give a smaller particle size than is obtainable using such combinations.

It would be desirable to provide a material that could serve as a surfactant stabiliser and that does not suffer from the various disadvantages of existing surfactant and stabilisers.

An oil soluble surfactant according to the invention is a reaction product of an oil soluble polyester carboxylic acid and a water soluble polyamine that has a molecular weight of at least 500 and that contains at least 5 basic nitrogen atoms.

The oil soluble polyester carboxylic acid is a polyester having one free carboxylic acid group. Generally it has the formula RCOOH where R is a polyester chain that imparts oil solubility.

The preferred polyester carboxylic acid is a condensate of a hydroxy carboxylic acid containing a hydrocarbon group that usually contains 1 to 30 carbon atoms. For best results the number of carbon atoms is generally at least 4 and preferably at least 8 and usually is not more than 24. A hydrocarbon group of 10 to 20 carbon atoms is often preferred. Although some polyfunctionality can be acceptable, especially with the lower molecular weight polyesters, it is generally preferred that the polyester carboxylic acid should be a monocarboxylic acid so as to reduce the risk of unwanted cross linking and insolubilisation of the surfactant. The oil soluble polyester carboxylic acid thus may have the formula $R^2(COOR^1)_nCOOH$ where $R^1$ and $R^2$, which may be the same or different, are $C_{1-34}$ (usually $C_{8-24}$) hydrocarbon groups, optionally substituted by non-interfering substituents, and n is an integer above 1 such that the polyester carboxylic acid has the desired molecular weight and oil solubility.

Similar results can be achieved, generally less conveniently, by forming a condensate of a polycarboxylic acid with a polyhydroxy compound and which is generally terminated by a single carboxylic acid group. The polycarboxylic acid is usually a dicarboxylic acid and the polyhydroxy compound is usually a diol, so as to avoid the risk of insolubilisation of the polyester. These polyesters can have the formula $R^2COO(R^3OOCR^1COO)_nR^3OOCR^1COOH$ where each of $R^1$, $R^2$ and $R^3$ may be selected from $C_{1-34}$ hydrocarbon groups and n is an integer of at least 1 such that the polyester has the desired molecular weight and oil solubility. For instance $R^1$ and $R^2$ are frequently $C_{8-24}$ hydrocarbon groups whilst $R^3$ can be similar or can be, for instance, a $C_{2-10}$ hydrocarbon group, often $C_{2-3}$ hydrocarbon group.

The polyester carboxylic acids are generally made by self-condensing the hydroxy carboxylic acid, or by condensing the poly carboxylic acid and the poly hydroxy compound, in the presence of a carboxylic acid chain terminator, for instance a carboxylic acid that is free of esterifiable hydroxyl compounds, and that often has the same hydrocarbon residue as the hydroxy carboxylic acid or poly carboxylic acid that is being condensed.

It is particularly preferred that the polyester carboxylic acid should be a condensate of 12-hydroxy stearic acid or ricinoleic acid in the presence of a chain terminating amount of stearic or other fatty acid that is free of hydroxyl groups. In particular a mixture of 12-hydroxy stearic acid with stearic acid, typically in the proportions conventionally present in commercial 12-hydroxy stearic acid, is preferred.

The condensation reaction for the formation of the polyester carboxylic acid is generally conducted in the presence of an esterification condensation catalyst, typically a strong acid. The reaction is preferably forced by conducting it in a suitable hydrocarbon solvent which is able to form an azeotrope with the water produced during esterification. The reaction is preferably carried out under an inert atmosphere. Suitable esterification catalysts include acids and acid salts, preferably para toluene sulphonic acid. The reaction temperature is generally in the range 100 to 250° C., usually around 120 to 180° C.

The molecular weight of the polyester carboxylic acid is generally above about 500 and preferably is above about 1,000. It is usually below about 10,000 and preferably is below about 4,000. Values in the range about 1,500 to 3,000, especially about 2,000 to 2,500, are generally preferred. The precise molecular weight can be controlled by the amount and time of the addition of chain terminating agent.

The polyester carboxylic acid, and the final polymeric surfactant, should be oil soluble, that is to say soluble in the substantially non-polar liquid in which the surfactant is to be utilised. A suitable definition of oil soluble is given in GB No. 2,002,400A.

The polyamine must be water soluble, in the sense that it must be preferentially soluble in water and when, as is preferred, the surfactant is to be used for stabilising a water-oil system the polyamine should be soluble in the water phase.

The water soluble polyamine must contain at least 5 basic nitrogen atoms per molecule and must have molecular weight above 500. The preferred polyamine is polyethylene imine but various other polymeric amines can be used, for instance polyvinyl amines, polyallyl amines and polyalkylene polyamines. The molecular weight of the polymeric amine must be above about 500 as otherwise the product is ineffective. Generally it is above 1,000 and often it is above 5,000. The molecular weight can be very high, for instance several million, but the use of these high values generally does not improve the surfactant properties of the end product and can cause handling and manufacturing difficulties and so generally the molecular weight is below about 1 million and preferably is below about 300,000. Best results are generally achieved when the molecular weight is in the range 1,000 to 15,000, preferably around 5,000 to 10,000.

The mole ratio of polyester:polyamine (i.e., the mole ratio carboxylic groups to amine groups) is generally 1:0.2 to 1:4. The optimum ratio depends on the molecular weight of each component and the balance that is required of hydrophilic and hydrophobic groups. For instance when the polyester has a molecular weight of around 2,000 and the polyamine a molecular weight in the range 1,000 to 7,000 and the surfactant is to stabilise an emulsion in aliphatic and/or naphthenic hydrocarbon of aqueous, water-soluble, acrylic monomer then the mole ratio of polyester:polyamine is generally from 1:1 to 1:2.

A preferred class of surfactants according to the invention are reaction products of one mole oil soluble polyester carboxylic acid that is a monocarboxylic condensate of hydroxy stearic acid and has molecular weight 1,500 to 3,000 with 0.5 to 3 moles polyethylene imine of molecular weight 1,000 to 30,000.

The condensation of the polyester carboxylic acid with the polyamine can be effected by adding the polyamine, generally as an aqueous solution, to a solution in oil of the polyester and heating the reaction while agitating to effect condensation, generally at a temperature of 100 to 200° C., preferably around 130 to 180° C. The reaction is preferably forced by removing water azeotropically. The course of the reaction can be observed by watching the extent of reaction of the carboxylic acid groups to carboxylic amide groups. Although the reaction can go to substantial completion, e.g., 97%, it is usually satisfactory to terminate the reaction at from 40 to 85% completion, often 65 to 85%, depending on the molecular weight and degree of branching of the polyamine. Alternatively, unreacted polyester carboxylic acid can be added to the reaction product for use as surfactant.

The product of the process is a solution of the surfactant condensate in oil, and the product is usually used as such. If desired however it may be isolated by conventional techniques.

The invention includes also a dispersion of organic or inorganic particles in a substantially non-polar organic liquid containing an oil soluble surfactant according to the invention. The substantially non-polar organic liquid may be an organic liquid having low or very low polarity. Typically the non-polar organic liquid is a hydrocarbon, generally an aliphatic and/or naphthenic hydrocarbon solvent and generally can be any of the materials conventionally used as the non-aqueous liquid phase of reverse phase polymerisation processes.

The surfactant stabiliser of the invention can be used in a wide variety of situations where a hydrophilic organic or inorganic phase is to be stabilised and/or emulsified in a non-aqueous liquid, such as any of those discussed above.

The invention includes a dispersion of water soluble or water swellable polymer particles in non-aqueous liquid stabilised by a dispersion promoter comprising the surfactant stabiliser of the invention. The dispersion promoter may comprise also a conventional amphipathic polymeric stabiliser and/or non-polymeric surfactant but preferably the dispersion promoter consists only of the surfactant stabiliser of the invention.

The polymer particles may be aqueous polymer particles or they may be substantially dry polymer particles. The polymer may be a naturally occurring polymer such as starch, dextrin or a biologically produced polymer such as xanthan gum, or it can be a synthetic polymer such as a polymer formed from a water soluble ethylenically unsaturated monomer or monomer blend.

The dispersion may be an unstable dispersion wherein the polymer particles are beads of synthetic polymer, typically having a size above 50 μm, or the dispersion may be a stable dispersion of polymer particles below 10 μm. The dispersion may be made by reverse phase bead polymerisation or, more usually, dispersion polymerisation into a particle size below 10 μm. The reverse phase dispersion polymerisation usually is conducted under suspension polymerisation kinetics and thus the particle size is controlled primarily by the amount of shear that is applied during the formation of the initial emulsion of aqueous monomer droplets in non-aqueous liquid in the presence of the selected dispersion promoter.

It is particularly preferred that the reverse phase polymer dispersion that is stabilised by the surfactant of the invention should be made by reverse phase dispersion polymerisation of aqueous polymerisable monomer dispersed in a water immiscible liquid containing the surfactant, followed by azeotroping. The azeotroping can be conducted to give a substantially dry dispersion of polymer particles dispersed in oil.

When using surfactant stabiliser according to the invention the total amount of dispersion promoter that is required to stabilise a dispersion is generally substantially less than is required when using conventional stabilisers such as those discussed above and, in particular, the total amount is generally below 10% by weight of polymer or other dispersed phase and, in particular, the amount of monomeric or other conventional low HLB surfactant is generally always below 2% or 3% based on polymer, and is preferably substantially zero.

Despite the use of low amounts of the surfactant stabiliser, the particle size of the reverse phase dispersions is usually smaller than with conventional systems, typically being below 1.5 $\mu$m and often much less. The resultant emulsions and dispersions usually have lower viscosity, and lower pour point compared to the dispersions and emulsions made using conventional emulsifiers and stabilisers. In particular, the dispersions can be subjected, when necessary, to high shear and high temperature, for instance in a thin film evaporator, with greatly reduced risk of agglomeration, drying out and caking of the evaporator surfaces.

When the dispersion contains water, for instance from its original formation or as a result of the addition of water to an azeotroped reverse phase polymerisation dispersion, the use of the surfactant stabilisers of the invention has the advantage that the dispersion will tend to have increased freeze-thaw stability compared to dispersions made with conventional emulsifiers and stabilisers.

The surfactant stabiliser of the invention is also useful as the stabiliser in a dispersion polymerisation process of the general type described in GB No. 1,123,611 and in such processes when modified to produce water soluble or water swellable polymer particles from a water soluble ethylenically unsaturated monomer or monomer blend. For instance the process may be conducted in a non-aqueous liquid reaction medium that is a solvent for the monomer or monomer blend and is a non-solvent for the polymer particles, the process comprising forming a solution of the monomer or monomer blend in the reaction medium and polymerising the monomer or monomer blend in the presence of initiator, usually oil soluble initiator, while the reaction medium contains an amount of the dispersion promoter according to the invention such that the polymeric particles that are formed by the polymerisation are provided as a stable dispersion in the non-aqueous liquid.

The following are some examples.

EXAMPLE 1

Preparation of a 1:2 molar condensate of Poly 12-Hydroxystearic acid and Polyethyleneimine 1713 gms of commercial 12-Hydroxystearic acid, 856 gms of xylene and 5.14 gms of methane sulphonic acid were charged into resin pot equipped with a nitrogen gas inlet, a stirrer, a thermometer and set up for azeotropic distillation. The flask and contents were deoxygenated with nitrogen gas and heated to reflux (about 155° C.) water was removed by azeotropic distillation. When no further water was seen to be distilling the reaction mass sampled and the product molecular weight checked by volumetric titration of the carboxylic acid content. When this had reached a maximum (usually after about 6 hours and at a value usually of the order of 1900–2100), the reaction was cooled to 70° C. and 147.3 gms of a 50% aqueous solution of polyethyleneimine of molecular weight about 7000 was added. Again the flask and contents were deoxygenated with nitrogen gas and the water removed azeotropically up to a temperature of 155–165° C. After about 7 hours the product was sampled to determine the degree of reaction of carboxylic acid groups. After the degree of reaction had reached a maximum of 67% the xylene was stripped off the condensate by vacuum distillation, cooled to 70° C. and then 1120 gms of SBP11 was added to produce a 60% solution of condensate in SBP11.

EXAMPLE 2–16

Preparation of further condensates of Poly 12-Hydroxystearic acid and polyamines

| Example No. | Amine | Molecular Weight of Amine | Moles of Amine per Mole of Carboxylic Acid | % Reaction to Amide |
|---|---|---|---|---|
| 2 | Diethylene-triamine | 103 | 0.5 | 97 |
| 3 | Tetraethylene-pentamine | 189 | 0.3 | 95 |
| 4 | Polyethylene-imine | 600 | 1 | 56 |
| 5 | Polyethylene-imine | 1200 | 57 | |
| 6 | Polyethylene-imine | 1800 | 1 | 57 |
| 7 | Polyethylene-imine | 7000 | 1 | 47 |
| 8 | Polyethylene-imine | 10,000 | 1 | 62 |
| 9 | Polyethylene-imine | 30,000 | 1 | 48 |
| 10 | Polyethylene-imine | ~1,000,000 | 1 | 45 |
| 11 | Polyethylene-imine | 7,000 | 0.5 | 40 |
| 12 | Polyethylene-imine | 7,000 | 1.5 | 56 |

-continued

| Example No. | Amine | Molecular Weight of Amine | Moles of Amine per Mole of Carboxylic Acid | % Reaction to Amide |
|---|---|---|---|---|
| 13 | Polyethyleneimine | 7,000 | 2.0 | 65 |
| 14 | Polyethyleneimine | 7,000 | 3.0 | 72 |
| 15 | Polyethyleneimine | 10,000 | 2.0 | 82 |
| 16 | Polyethyleneimine | 30,000 | 2.0 | 70 |

These condensates were produced by the same method of example 1.

EXAMPLE 17

Preparation of a Polymer Dispersion using the Stabiliser of Example 1

A monomer solution was prepared comprising 413 gms of acrylamide, 155 gms of acrylic acid, 7 gms of a 40% solution of pentasodium diethylene triamine pentacetate, 899 gms of water and 187 gms of a 46% aqueous solution of sodium hydroxide and adjusted to pH7.0.

A non-aqueous phase was prepared comprising 83 gms of the 60% solution of stabiliser prepared in example 1 (equivalent to 3% of stabilisier on weight of aqueous phase), 453 gms of Solvent Pale Oil 150 and 602 gms of SBP11.

The aqueous phase was homogenised into the oil phase using a Silverson mixer to produce an inverse emulsion of monomer solution. This was deoxygenated with nitrogen gas and polymerised using 10 parts per million of tertiary butyl hydroperoxide and 3 parts per million per hour of sodium metabisulphite (added as a 0.05% solution in water) on weight of aqueous monomer solution. The temperature of the inverse emulsion increased from 25° C. to 90° C. over a period of about 50 minutes then the water and volatile hydrocarbons (SBP11) were removed by distillation under reduced pressure in a thin film evaporator to produce a dehydrated concentrated dispersion at 55% polymer content by weight.

1091 gms of this dispersion were mixed with 219 gms of Exsol D100, 100 gms of a 5 mole ethoxylate of nonyl phenol, 10 gms of sorbitan mono-oleate and 580 gms of water to produce a 'wet-back' inverse emulsion comprising 30% by weight polymer, 29% by weight water and 41% by weight of stabilising and inverting surfactants, oil and hydrocarbon solvent.

The average particle size of the dehydrated dispersion was 0.90 microns. The dispersion had a Brookfield viscosity (speed 10 rpm) at 940 cps and a pour point of less than −30° C. The wet-back inverse emulsion produced from the dispersion had a pour point of less than −30° C.

EXAMPLES 18–38

Preparation of further Polymer Dispersions using Stabilisers 2–16

Further dispersions were produced by the method of Example 17 using the stabilisers of Examples 2–16 as Stabiliser A. Also some dispersions containing conventional amphipathic polymeric stabiliser based on a 2:1 molar ratio copolymer of ceto-stearyl methacrylate and methacrylic acid (Stabiliser C) and a conventional low HLB surfactant B (Sorbiton mono-oleate) were produced and tested as comparative examples.

| Example No. | Stabiliser Example and | A % | B % | C % | Dispersion Viscosity | Dispersion Pour Point (°C.) | Wet Back Pour Point |
|---|---|---|---|---|---|---|---|
| 18 | — | 0 | 3 | 0 | COAGULATED ON DISTILLATION | | |
| 19 | — | 0 | 2 | 1 | 1700 | −7 | 0 |
| 20 | — | 0 | 1 | 2 | 1200 | −5 | +2 |
| 21 | — | 0 | 0 | 3 | 850 | +5 | +5 |
| 22 | 2 | 3 | 0 | 0 | COAGULATED ON DISTILLATION | | |
| 23 | 3 | 3 | 0 | 0 | " | | |
| 24 | 8 | 2 | 1 | 1 | 3020 | −10 | −16 |
| 25 | 15 | 2 | 1 | 1 | 1150 | −14 | −22 |
| 26 | 9 | 2 | 1 | 1 | 3190 | −10 | −8 |
| 27 | 16 | 2 | 1 | 1 | 1280 | −12 | −14 |
| 28 | 8 | 1.5 | 1.5 | 0 | COAGULATED ON DISTILLATION | | |
| 29 | 15 | 1.5 | 1.5 | 0 | 2250 | >−30 | >−30 |
| 30 | 9 | 1.5 | 1.5 | 0 | 3100 | >31 30 | >−30 |
| 31 | 16 | 1.5 | 1.5 | 0 | 1040 | >−30 | >−30 |
| 32 | 7 | 3 | 0 | 0 | 1880 | >−30 | >−30 |
| 33 | 7 | 1.5 | 1.5 | 0 | 2080 | >−30 | >−30 |
| 34 | 13 | 3 | 0 | 0 | 950 | >−30 | >−30 |
| 35 | 13 | 1.5 | 1.5 | 0 | 1250 | −20 | >−30 |
| 36 | 16 | 3 | 0 | 0 | 1250 | >−30 | >−30 |
| 37 | 16 | 2 | 0 | 0 | 940 | >−30 | >−30 |
| 38 | 16 | 1 | 0 | 0 | 805 | >−30 | >−30 |

Examples 18 to 23 do not use dispersion stabilisers according to the invention and are comparative, and Example 28 is comparative since it demonstrates (in contrast to Example 24) that if insufficient dispersion stabiliser is used then the dispersion will, of course, be unstable.

Comparative Example 18 to 21 demonstrate that it is only possible, with existing stabiliser systems, to obtain both stability during azeotroping and low dispersion viscosity if the pour point is unacceptably high. Examples 22 and 23 show that useful results are not obtained when the polyamine has a molecular weight that is too low.

If the process of Example 18 is repeated using a condensate of poly-hydroxy stearic acid and polyethylene glycol, in accordance with GB No. 2,002,400, either alone or with monomeric surfactant, the dispersion will coagulate during azeotropic distillation.

I claim:

1. In a dispersion of organic polymeric particles in a substantially non-polar, organic, water immiscible liquid containing an oil soluble surfactant as a dispersion stabiliser wherein the dispersion has been made by a process comprising reverse phase polymerisation, the improvement which comprises using, as said oil soluble surfactant, a reaction product of an oil soluble polyester carboxylic acid having molecular weight greater than 1500, with a water soluble polyamine that has molecular weight above 500 and that contains at least 5 basic nitrogen atoms and wherein the molar ratio carboxylic acid groups : amine groups is 1:1 to 1:3.

2. A dispersion according to claim 1 wherein the molar ratio is 1:1 to 1:2.

3. A dispersion according to claim 1 in which the liquid is a hydrocarbon solvent.

4. A dispersion according to claim 1 that is a reverse phase polymer dispersion made by reverse phase dispersion polymerisation of aqueous polymerisable monomer dispersed in water immiscible liquid and subsequently been subjected to azeotroping.

5. A dispersion according to claim 4 to which water has been subsequently added.

6. A dispersion according to claim 1 in which the surfactant is a reaction product of a monocarboxylic self condensate of hydroxy stearic acid having a molecular weight of 1,500 to 3,000 with polyethylene imine having molecular weight 1,000 to 30,000.

7. A dispersion according to claim 1 in which the polyester carboxylic acid is a self-condensate of a hydroxy carboxylic acid having hydrocarbon group of 4 to 30 carbon atoms.

8. A dispersion according to claim 1 in which the polyester carboxylic acid is a self-condensate of a hydroxy carboxylic acid having a hydrocarbon group of 10 to 20 carbon atoms.

9. A dispersion according to claim 1 in which the polyester carboxylic acid is a self-condensate of hydroxy stearic acid or ricinoleic acid.

10. A dispersion according to claim 1 in which the polyester carboxylic acid is a monocarboxylic acid.

11. A dispersion according to claim 1 in which the polyamine is polyethylene imine.

12. A dispersion according to claim 1 in which the polyester carboxylic acid has a molecular weight of 500 to 10,000 and the polyamine has a molecular weight of 1,000 to 1 million.

13. A dispersion according to claim 1 in which the polyester carboxylic acid has a molecular weight of 1,000 to 4,000 and the polyamine has a molecular weight of 1,000 to 30,000.

* * * * *